Patented June 2, 1953

2,640,766

UNITED STATES PATENT OFFICE 2,640,766

ETCHING

John A. Easley and Harry E. Swayze, Midland, Mich., assignors to The Dow Chemical Company, Midland, Mich., a corporation of Delaware No Drawing. Application February 12, 1951, Serial No. 210,617

10 Claims. (Cl. 41—42)

The invention relates to a method of etching metal. It more particularly concerns an improved method of producing a relief in the surface of an object of metal, as in making a printing plate by etching with an acid solution.

In the conventional method of making a metal printing surface, as in making a photoengraving of an acid-soluble metal such as magnesium and the magnesium-base alloys, a light sensitive coating or "enamel" is applied to the metal surface which is usually flat or cylindrical. The coated surface is exposed to light through a negative having an image therein so as to produce a corresponding image in the coating. The exposed coated surface is "developed" forming an acid resistant coating in the form of the image produced by the exposure. The acid resistant coating, which is referred to as a resist, is usually further hardened as by a hardening treatment which increases its resistance to the etching acid. The surface of the metal bearing the so-prepared resist is then subjected to etching by an acid.

The etching is usually carried out with nitric acid suitably diluted with water, the acid solution being usually splashed or otherwise impinged against the object. The acid solution attacks the bare portions of the metal, that is, the portions of the object denuded of the light sensitive material in the developing operation. The rest of the metal surface is protected by the resist from direct attack by the acid which does not penetrate the resist. As the etching proceeds, metal from the bare portions of the object dissolves away leaving the adjacent image in vertical relief. As soon as a moderate depth of etch is made in this way attack by the acid in a lateral direction on the metal supporting the acid-resisting image becomes noticeable and the resist may be undercut slightly around its edges. Before a significant amount of the metal forming the relief is dissolved away by lateral attack, the etching solution is rinsed off, the rinsed object is dried, and the dried object is then treated to protect the metal relief from lateral attack by the acid when the object is subjected to further etching. One method of providing this protection is to powder the object in each of four directions, i. e. N. S. E. and W. with an acid-resisting powdered material called "etching powder" so as to coat with the powder all sides of the portions of the metal in relief. After each powdering, the powder is "burned in," that is, the powdered etched object is heated to fuse and fix the acid-resisting material in place as an acid resistant coating. The object thus protected by powdering or otherwise is then given a second etch. This etch increases the depth of the prior etch without attack on the metal already in relief, the sides of which are protected from the acid.

The second etch, like the first, is stopped before a significant amount of attack is produced on the sides of the relief below the protected portion, and, as before, the etched object is again rinsed, dried, and given a protective treatment as by powdering so as to form an acid-resisting coating on all sides of the newly formed portion of the relief. The object is then ready for a third etch which is carried out in a manner similar to the preceding etches. The object is thus alternately subjected to etching, protecting of the relief, and etching so as to accentuate the relief while restraining attack by the acid on the image-supporting metal in relief, until a sufficient depth of etch is produced in the surface of the object not coated with resist to meet printing requirements. The number of etches made by the acid or "bites," as these etches are called in the trade, is usually three, four, or five depending upon the character of the image and the depth of etching required. The foregoing steps are well-known in the art and are practiced in various ways best adapted to the work in hand.

Although the acid etches away the metal rapidly, the time taken for the entire operation of completing the preparation of the relief or printing surface for example, when several bites are to be made, is inordinately large. This is due mainly to the numerous time-consuming steps of rinsing, drying, and protecting the relief which are required between each bite of the etcher to prevent undercutting the image while obtaining a sufficient depth of etch for the purpose in hand and are more time-consuming than the etching operation itself.

It is the principal object of the invention to provide a method of preparation of a metal relief by etching with acid, as in the preparation of a printing surface, which may be carried out with dispatch. Another object of the invention is to reduce or prevent the attack of the acid on the metal in relief under an acid resist and thereby reduce or eliminate the need for interposing one or more protective treatments, e. g. powdering and burning in, to save the relief from lateral attack as it forms during etching. Other objects and advantages will become apparent during the description of the invention.

The invention is predicated upon the discovery that by including in the acid etching bath, and impinging the bath composition against the object to be etched, certain agents which produce a removable acid resistant film that exerts a controlling effect on the dissolving action of the acid, the dissolving action of the acid normal to the surface of the work is not adversely affected while the dissolving action laterally, that is, in a direction which tends to dissolve away metal in relief and undercut the resist, is substantially reduced. As a result, there is obtained a deeper etch without significant loss in area of surface in relief and one or more, if not all, protective treatments, applied after the relief forms to prevent lateral etching of the relief, may be eliminated. The elimination of more or less, if not all the protective treatments, results in faster production of a finished etched object and substantial savings in both labor and materials.

In connection with evaluating the effects of the agents added to the acid etching bath according to the invention for controlling the etching action of the acid, the term "etch factor" is used. This term is defined as the ratio of the depth of the etch adjacent to a line of resist to one-half the loss in width of metal at the top of the surface of the relief beneath the line of resist. The etch factor affords a measure of the amount of attack by the acid laterally (i. e. parallel to the surface bearing the relief) compared to the amount of attack downwardly (i. e. normal to the surface bearing the relief). The etch factor varies to some extent with the area of the bare metal exposed to the etcher as well as the depth of etch. For purposes of making comparative tests, these variations may be ignored if the bare metal surface adjacent to the resist is at least 0.02 inch wide and the etch is carried to a depth of at least 0.005 inch in each test.

In tests of nitric acid solutions consisting of from 1 to 50 per cent of $HNO_3$ in water by weight, the etch factors observed range from about 1.5 to about 7 using a magnesium-base alloy plate having a nominal composition of 3 per cent aluminum, 1 per cent zinc, 0.2 per cent manganese, the balance being magnesium and strongly impinging the acid solution against the plate, as by means of an air stream or splashing, until etched to a depth of about 0.010 inch.

By the present invention, the etch factor of the nitric acid etching bath is substantially increased, thereby making it possible to reduce, as already mentioned, the overall time required to produce the desired depth of relief in the metal surface.

In carrying out the invention, nitric acid diluted with water to a suitable concentration is used. It is generally not desirable to greatly dilute the acid as this reduces its rate of action on the metal. On the other hand, if insufficient dilution is employed, the action of the acid may be too severe and the resist may be injured, as when the concentration exceeds about 50 per cent of $HNO_3$ by weight. Concentrations in the range of 3 to 20 per cent $HNO_3$ are generally most useful. A preferred range of concentrations is 5 to 10 per cent, while a concentration of 7 per cent of $HNO_3$ by weight is generally satisfactory.

In accordance with the invention, there is added to the suitably diluted (with water) nitric acid solution an agent which increases the etch factor and comprises an ester of sulfosuccinic acid and an aliphatic alcohol having from 4 to 12 carbon atoms. Examples of such esters are: the alkali metal salts; diisobutyl sodium sulfosuccinate, diamyl sodium sulfosuccinate, dihexyl sodium sulfosuccinate and dioctyl sodium sulfosuccinate. The amount of the ester to use depends upon the amount of $HNO_3$ in the nitric acid solution in that the higher the concentration of the $HNO_3$ the greater is the amount of ester required. In general, the ester may be used in an amount which is from 0.0014 to 0.15 times the amount of $HNO_3$ in the nitric acid solution.

The following examples are illustrative of the invention:

*Example 1*

A plate formed of a magnesium-base alloy having a nominal composition of 3 per cent of aluminum, 1 per cent of zinc, and 0.2 per cent of manganese, the balance being magnesium is coated with a conventional light sensitive enamel and exposed through a photographic negative having an image of a paragraph of printed matter in light face 5-point sans-serf type on a 6-point base. After the exposure, the plate is developed leaving a resist corresponding to the image of the printed matter, the remainder of the surface of the plate being bare.

An etching bath is made having the following formulation:

| | Parts by weight |
|---|---|
| 10.5% $HNO_3$ solution | 99.7 |
| Dioctyl sodium sulfosuccinate | 0.3 |

The plate is held above the bath at an angle of 45° to the horizontal with the resist facing downward, the mid-point of the plate being 10.5 inches above the bath. The bath is agitated and splashed up against the plate for about 4 minutes. The plate is rinsed, and dried. It is found to be etched to a depth of 0.0135 inch on the bare portions with an etch factor of 10.

*Example 2*

A similar magnesium-base alloy plate to that of Example 1 is coated with a light sensitive enamel in the usual way and exposed through a photographic negative having a series of parallel alternating opaque and transparent lines, the widths of the opaque lines being at least 0.12 inch. After exposure, the plate is developed leaving a series of parallel lines of resist corresponding to the transparent lines of the negative with spaces of bare metal at least 0.12 inch wide between each line of resist.

An etching bath is made having the following formulation:

| | Parts by weight |
|---|---|
| Aqueous nitric acid solution containing 10.6% of $HNO_3$ | 99.4 |
| Dioctyl sodium sulfosuccinate | 0.59 |
| A silicone defoamer | 0.01 |

The plate is etched in similar manner to that of Example 1 for 4 minutes then rinsed and dried. The plate is found to be etched to a depth of 0.006 inch with an etch factor of 15.2.

*Example 3*

An etching bath is made having the following formulation:

| | Parts by weight |
|---|---|
| Aqueous nitric acid solution containing 6.9% of $HNO_3$ | 99.0 |
| Dioctyl sodium sulfosuccinate | 1.0 |

The bath is agitated and impinged upon the resist bearing face of the plate with an air stream, as by an atomizing nozzle using air at 30 pounds per square inch, for 30 seconds. The plate is then rinsed and dried. The bare portions adjacent to a line of resist are found to be etched to a depth of 0.027 inch with an etch factor of 11.3.

For comparison, a similar plate bearing a similar resist and etched in the same manner using only the aqueous nitric acid solution containing 6.9 per cent of $HNO_3$ in the same length of time etches the bare portions adjacent to the resist to a depth of 0.028 inch with an etch factor of 4.

We claim:

1. An etching bath for etching magnesium or magnesium-base alloy comprising a mixture of an aqueous solution of nitric acid containing from 3 to 50 per cent of $HNO_3$ and an ester of sulfosuccinic acid and an aliphatic alcohol having from 4 to 12 carbon atoms, the amount of the ester being from 0.0014 to 0.15 times the amount of the $HNO_3$ in the nitric acid solution.

2. An etching bath according to claim 1 in which the ester is an alkali metal salt of dioctyl sulfosuccinate.

3. An etching bath according to claim 1 in which the ester is an alkali metal salt of diisobutyl sulfosuccinate.

4. An etching bath according to claim 1 in which the ester is an alkali metal salt of diamyl sulfosuccinate.

5. An etching bath according to claim 1 in which the ester is an alkali metal salt of dihexyl sulfosuccinate.

6. The method of etching an object of magnesium or magnesium-base alloy, said object having portions of its surface masked with an acid resistant coating, which comprises impinging upon the surface of the object so as to contact both the masked and unmasked portions thereof an etching composition comprising an aqueous solution which contains from 3 to 50 per cent of $HNO_3$ by weight, said solution having in admixture therewith an ester of sulfosuccinic acid and an aliphatic acid having from 4 to 12 carbon atoms, the amount of said ester being from 0.0014 to 0.15 times that of the $HNO_3$ in the nitric acid solution.

7. The method according to claim 6 in which the aqueous nitric acid solution contains from 3 to 20 per cent of $HNO_3$ by weight and the ester is an alkali metal salt of diisobutyl sulfosuccinate.

8. The method according to claim 6 in which the aqueous nitric acid solution contains from 3 to 20 per cent of $HNO_3$ by weight and the ester is an alkali metal salt of dioctyl sulfosuccinate.

9. The method according to claim 6 in which the aqueous nitric acid solution contains from 3 to 20 per cent of $HNO_3$ by weight and the ester is an alkali salt of diamyl sulfosuccinate.

10. The method according to claim 6 in which the aqueous nitric acid solution contains from 3 to 20 per cent of $HNO_3$ by weight and the ester is an alkali metal salt of dihexyl sulfosuccinate.

JOHN A. EASLEY.
HARRY E. SWAYZE.

References Cited in the file of this patent

UNITED STATES PATENTS

| Number | Name | Date |
|---|---|---|
| 1,994,500 | Boller | Mar. 19, 1935 |
| 2,176,423 | Jaeger | Oct. 17, 1939 |
| 2,375,007 | Larsen | May 1, 1945 |

OTHER REFERENCES

Dow Corning Silicone Notebook, Cpd. Series No. 1, revised Jan. 1949, Publ. by Dow Corning, Midland, Mich.